United States Patent [19]

Vick

[11] Patent Number: 5,198,895
[45] Date of Patent: Mar. 30, 1993

[54] HOLOGRAPHIC HEAD-UP DISPLAY

[75] Inventor: Gerald L. Vick, Mt. Vernon, Iowa

[73] Assignee: Rockwell International Corporation, Seal Beach, Calif.

[21] Appl. No.: 751,465

[22] Filed: Aug. 29, 1991

[51] Int. Cl.⁵ .............................................. H04N 7/18
[52] U.S. Cl. ................................. 358/103; 358/250; 340/705; 340/980
[58] Field of Search ............... 358/103, 250, 88, 90, 358/91, 92; 340/705, 980; 359/13, 14, 630-633

[56] References Cited

U.S. PATENT DOCUMENTS

| | | | |
|---|---|---|---|
| 4,048,653 | 9/1977 | Spooner | 358/104 |
| 4,315,240 | 2/1982 | Spooner | 340/27 |
| 4,315,241 | 2/1982 | Spooner | 340/27 |
| 4,422,720 | 12/1983 | Sheiman | 350/138 |
| 4,575,722 | 3/1986 | Anderson | 340/783 |
| 4,632,508 | 12/1986 | Connelly | 350/174 |
| 4,670,744 | 6/1987 | Buzak | 340/716 |
| 4,723,160 | 2/1988 | Connelly | 358/103 |
| 4,872,750 | 10/1989 | Morishita | 353/7 |
| 4,937,665 | 6/1990 | Schiffman | 358/103 |
| 4,994,794 | 2/1991 | Price et al. | 340/980 X |
| 5,061,996 | 10/1991 | Schiffman | 358/103 |

Primary Examiner—Victor R. Kostak
Attorney, Agent, or Firm—Gregory G. Williams; M. Lee Murrah; H. Fredrick Hamann

[57] ABSTRACT

An improved three dimensional head-up display utilizing a holographic optic element diffraction grating to selectively reflect light emitted from a first CRT into a first of the pilot's eyes and reflecting light from a second CRT into the second of the pilot's eyes.

3 Claims, 1 Drawing Sheet

HOLOGRAPHIC HEAD-UP DISPLAY

FIELD OF THE INVENTION

The present invention generally relates to head-up displays and more particularly relates to three dimensional head-up displays, and even more particularly concerns non-helmet mounted 3D head-up displays of a type capable of utilizing two high brightness video displays and a holographic optic element (HOE) head-up display (HUD) combiner for reflecting emission from each video display into only one of the pilots eyes.

BACKGROUND OF THE INVENTION

With the ever expanding frontiers of space and aviation, and with modern aircraft now operating at altitudes which only a few decades ago were thought to be impossible, it is becoming increasingly important to overcome some problems introduced by high altitude flight. At high altitudes, the ambient light is often quite bright and may adversely effect the performance of optical avionics equipment.

One particular type of avionics equipment in which high ambient light is posing vexing problems, is head-up displays. Basically, head-up displays utilize a reflecting combiner disposed on the aircraft wind screen so that an image generated by a video display device in the cockpit is projected upon the wind screen but still allowing the pilot to view the outside through the wind screen.

Three dimensional head-up displays have been attempted in the past, but often with undesirable aspects associated with them. For example, attempts have been made to mount the display generating devices on the pilots helmet. Such a device is shown in U.S. Pat. No. 4,315,241 entitled "Visual Display Apparatus issued on Feb. 9, 1982 to Archer M. Spooner which application is incorporated herein by this reference. Another attempt is described in U.S. Pat. No. 4,575,722 entitled "Magneto-Optic Display" issued on Mar. 11, 1986 to Robert H. Anderson, which is incorporated herein by this reference. The Anderson display utilizes a mechanically rotating mirror to reflect light into the pilot's eyes.

While these designs or variations of them, have been suggested in the past, they have several serious drawbacks. The Spooner invention requires the addition of light emitting devices to be mounted on the pilot's helmet. This increases the weight of the pilot's helmet and allows for only small and frequently low brightness video displays. The Anderson invention includes the mechanically rotating mirror which has the obvious disadvantage of moving parts.

Consequently, there exists a need to provide a 3D, non-helmet mounted head-up display which has high brightness and low helmet weight.

SUMMARY OF THE INVENTION

It is an object of the present invention to provide a 3D head-up display with high brightness.

It is a feature of the present invention to provide high brightness video displays for generating the desired image.

It is an advantage of the present invention to provide a head-up display which is viewable even in high ambient light.

It is another object of the present invention to provide a 3D head-up display which does not add weight to the pilot's helmet.

It is another feature of the present invention to include a holographic optic element combiner for reflecting light from the video display to only one eye.

It is another advantage of the present invention to eliminate the need for helmet mounted video display devices.

The present invention provides a 3D non-helmet mounted head-up display which is designed to satisfy the aforementioned needs, produce the earlier propounded objects, include the above described features, and achieve the already articulated advantages. The invention is carried out in a "video display-less" helmet in the sense that the helmet mounted video displays associated with some head-up displays is eliminated. Instead, CRT or other video displays are disposed in the cockpit but not on the pilot's helmet.

The invention is also carried out in a "ambient light wash out-less" system in the sense that washouts of images due to high ambient light are reduced. Instead high brightness CRT's are implemented.

Accordingly, the present invention relates to a 3D non-helmet mounted head-up display which includes at least two high brightness video displays located in the cockpit of an aircraft and an holographic optical element head-up display combiner designed to reflect light from each video display into only one of the pilot's eyes.

BRIEF DESCRIPTION OF THE DRAWINGS

The invention may be more fully understood by reading the following description of a preferred embodiment of the invention in conjunction with the appended drawings wherein.

DETAILED DESCRIPTION OF THE DRAWINGS

Figure 1:
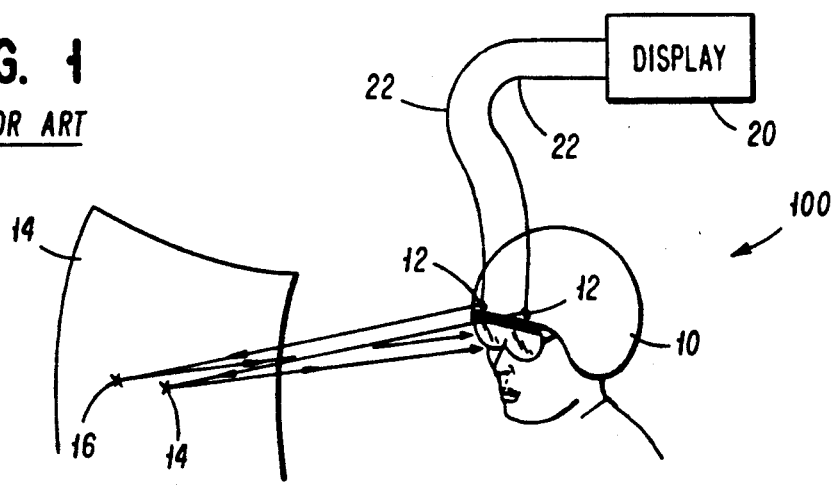
FIG. 1 is a perspective representation of a helmet mounted head-up display of the prior art.

Now referring to the drawings and more particularly referring to FIG. 1, there is shown a head-up display, of the prior art, generally designated 100, showing a pilot's helmet 10 having light emitters 12 disposed thereon for emitting light rays toward the retro screen 14. The light rays emitted from emitters 12 are shown striking the screen at points 16 and 18 and reflecting back into the pilot's eyes. In such an arrangement the retro screen 14 maybe a half silvered mirror. The light rays are transmitted from display device 20 through optical fibers 22 to the emitters 12. The head-up display 100 has the disadvantages of adding weight to the pilot's helmet because of the emitters 12 and further having a reduced brightness due to attenuation in the optical fibers 22.

Figure 2:
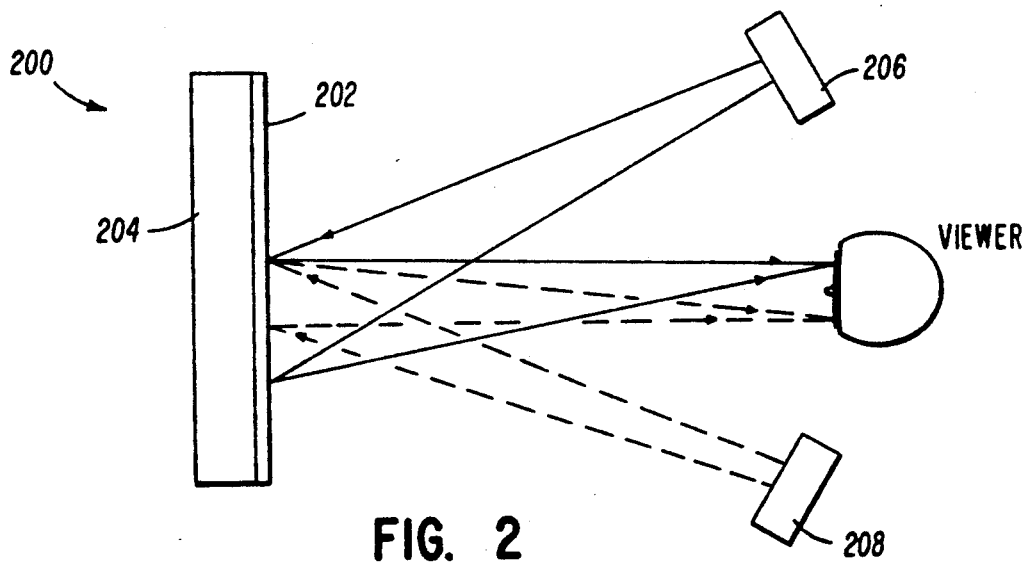
FIG. 2 is a perspective view of the 3D head-up display of the present invention.

Now referring to FIG. 2, there is shown a three dimensional holographic optic element head-up display of the present invention, generally designated 200 which includes a planar holographic optic element diffraction grating head-up display combiner 202 disposed between the pilot and the aircraft wind screen 204. Also shown are a first video display device 206 and a second video display 208. Preferably video display devices 206 and 208 are high brightness displays such as CRT's, LCD's, or TFEL's. The images generated and emitted from first display 206 are reflected off the combiner 202 so that they are incident only upon one of the pilot's eyes.

Similarly the image emitted from the second display device 208 are reflected off the combiner 202 so they are incident only on the other of the pilot's eyes. The pilot is then capable of viewing a 3D image, due to the stereo images provided to his eyes. No special optical equipment is required to be affixed to the pilot's helmet in order for her to view the 3D image.

Figure 3:
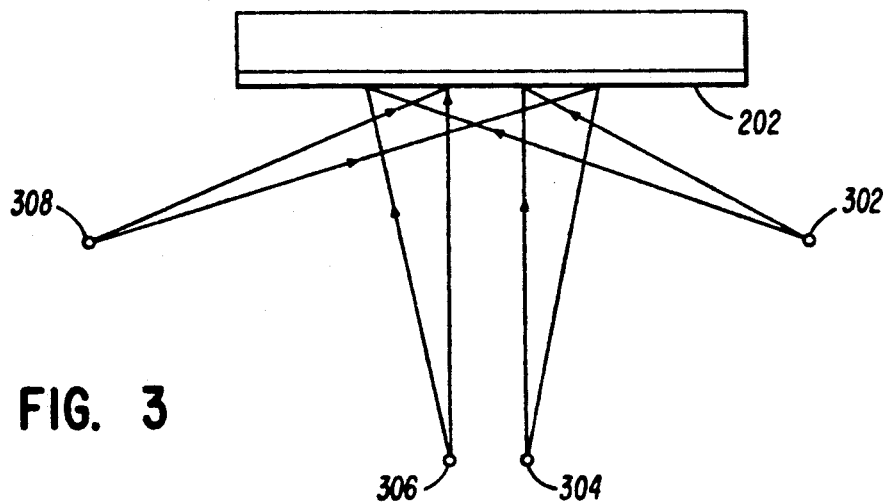
FIG. 3 is a perspective view of the arrangement of the holographic optic element diffraction grating manufacturing assembly of the present invention.

Now referring to FIG. 3 there is shown an assembly for manufacturing the holographic optic element combiner 202 of FIG. 2. The combiner 202 is manufactured by exposing a holographic optic recording medium, which are well known in the art, to four light sources disposed at different distances and angles from the recording medium 202. Shown is a first slit light source 302 wherein the slit is at right angles to the figure, and the source is located at the same relative position from the combiner 202 as would be the first video display 206 (FIG. 2). A first point source 304 is shown disposed at the same relative position from the combiner 202 as would be the first of the pilot's eyes. Also shown is a second point source 306 disposed at the same relative position from the combiner 202 as the pilot's second eye and also shown is second slit source 308 disposed at the same relative position from the holographic optic element combiner as would be the second video display device.

The combiner 202 is manufactured using well known techniques of manufacturing holographic optic element diffraction gratings when well known recording mediums are exposed to well known light sources arranged as shown in FIG. 3.

The improved head-up display, of the present invention, and many of its attendant advantages will be understood from the foregoing description and it is will be apparent that various changes maybe made in the form, construction, and the arrangement of the parts, without departing from the spirit and scope of the invention or sacrificing all of its material advantages, the form herein being merely a referred or exemplary embodiment thereof.

I claim:

1. An improved head-up display of the type used in an aircraft having a wind screen and further having a cockpit with a predetermined space therein for the pilot to sit and further having a first subspace and a second subspace therein where the pilot's eyes will be located during flight; the improved head-up display comprising:
   first video display device for emitting light representative of a predetermined image, located in cockpit;
   a second video display device for emitting light representative of said predetermined image located in the cockpit; and
   an angularly selective holographic optic element diffraction grating, for reflecting light emitted from said first video display into said first subspace, but not into said second subspace; said diffraction grating further for reflecting light emitted from said second video display device into said second subspace but not into said first subspace; said diffraction grating disposed adjacent said windscreen; so that, a stereoscopic reproduction of said predetermined image is created when said pilot's first eye is disposed in said first subspace and said pilot's second eye is disposed in said second subspace and when said first and second eyes simultaneously view light representative of said predetermined image, from said first video display device and said second video display device respectively.

2. An improved head-up display comprising:
   a first video display, for emitting light, located in a first portion of an aircraft cockpit;
   a second video display, for emitting light, located in a second portion of an aircraft cockpit; and
   an angularly selective holographic optic element diffraction degrating, disposed in said aircraft cockpit at a third location and for selectively reflecting light emitted from said first video display and said second video display; said angularly selective holographic optic element diffraction degrating being manufactured by exposing a holographic optic element recording medium to four light sources, wherein a first light source is located at the same relative direction and distance from the holographic optic element recording medium as the first location is from the third location, and the second light source is located at the same relative direction and distance from holographic optic element recording medium as the second location is from the third location.

3. A head-up display comprising:
   a first video display for emitting light representative of an image;
   a second video display for emitting light representative of said image;
   an angularly selective holographic optic element defraction grating that reflects light from a said first video display into a first predetermined space and does not reflect light from said second video display into said first predetermined space; and
   said holographic optic element further reflecting said light from said second video display into a second predetermined space, so that, a three dimensional representation of said image is created when a viewer simultaneously views said image from said first video display and said second video display.

* * * * *